(12) United States Patent (10) Patent No.: US 7,577,615 B1
Steinmetz et al. (45) Date of Patent: Aug. 18, 2009

(54) AUTOMATED BANKING MACHINE CONFIGURATION SYSTEM AND METHOD

(75) Inventors: Richard A. Steinmetz, St. Cloud, FL (US); Richard P. Brunt, Springfield, MA (US); Kenneth W. Zahorec, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 1087 days.

(21) Appl. No.: 10/648,936

(22) Filed: Aug. 27, 2003

Related U.S. Application Data

(62) Division of application No. 09/957,982, filed on Sep. 21, 2001, now Pat. No. 6,672,505.

(60) Provisional application No. 60/235,587, filed on Sep. 27, 2000.

(51) Int. Cl.
*G06Q 40/00* (2006.01)
(52) U.S. Cl. .............................. 705/44; 705/35; 705/43
(58) Field of Classification Search .................. 705/35, 705/39–40, 41, 43, 44
See application file for complete search history.

(56) References Cited

U.S. PATENT DOCUMENTS

| 5,157,717 | A | 10/1992 | Hitchcock | |
|---|---|---|---|---|
| 6,253,997 | B1 | 7/2001 | Inaoka et al. | |
| 6,302,326 | B1 | 10/2001 | Symonds et al. | |
| 6,310,966 | B1 * | 10/2001 | Dulude et al. ............... | 382/115 |
| 6,443,359 | B1 | 9/2002 | Green et al. | |
| 6,505,177 | B1 | 1/2003 | Drummond et al. | |
| 6,705,517 | B1 * | 3/2004 | Zajkowski et al. .......... | 235/379 |

FOREIGN PATENT DOCUMENTS

JP 2001126098 A 5/2001

OTHER PUBLICATIONS

U.S. Appl. No. 60/031,956, filed Nov. 27, 1996.*
Closing the deal from any distance Encrypted 'signatures' to make it safe; [Final Edition] Elizabeth Weise. USA Today. McLean, Va.: Feb. 7, 2000. p. 03.D.*
CertCo, Digital Signature Trust and Zions Bank Showcase Bank-Led Internet Commerce Business/Technology Editors. Business Wire. New York: Sep. 9, 1998. p. 1.*

(Continued)

*Primary Examiner*—Lalita M Hamilton
(74) *Attorney, Agent, or Firm*—Christopher L. Parmelee; Ralph E. Jocke; Walker & Jocke

(57) ABSTRACT

An automated banking machine (10, 70, 146) is operative to enable a plurality of authorized software components (80) to be selectively configured. The machine may be provided with either an authorization key (46, 72) or a configuration certificate (48, 150, 160) that is generated by a licensing authority (30, 62, 140). The machine is operative to authenticate the key or certificate prior to granting a user permission to configure the machine. The machine is operative to authenticate a configuration certificate by evaluating a digital signature (154, 190) associated with the configuration certificate. An authorization key may be authenticated by comparing it to a second authorization key generated responsive to a plurality of configuration parameters and one-way hash functions (92, 94). The key or certificate may be associated with a plurality of configuration rules (84, 152) which specify the configuration software components and parameters for specific ATM software and hardware.

14 Claims, 6 Drawing Sheets

OTHER PUBLICATIONS

Microsoft To Battle Sabotage / Software giant will use encryption to keep data private; [Final Edition] Don Clark, Chronicle Staff Writer. San Francisco Chronicle (pre-1997 Fulltext). San Francisco, Calif.: Jun. 3, 1991. p. B.1.*

* cited by examiner

AUTOMATED BANKING MACHINE CONFIGURATION SYSTEM AND METHOD

This application is a divisional of co-pending application Ser. No. 09/957,982 filed on Sep. 21, 2001, which claims the benefit of U.S. Provisional Application Ser. No. 60/235,587 Filed Sep. 27, 2000.

CROSS REFERENCE TO RELATED APPLICATIONS

This application claims benefit of U.S. Provisional Application Ser. No. 60/235,587 filed Sep. 27, 2000.

TECHNICAL FIELD

This invention relates to automated banking machines. Specifically this invention relates to an automated banking machine configuration system and method that provides for the selective and secure activation and configuration of software components and operational parameters.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The types of banking transactions a customer can carry out are determined by capabilities of the particular banking machine and the programming of the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or travelers checks. For purposes of this disclosure an automated banking machine or automated transaction machine shall encompass any device which carries out transactions including transfers of value.

ATM platforms often have the ability to perform different types of transaction functions depending on the types of software applications that are installed on the machine. Thus one ATM machine may be operatively configured with software to perform only certain banking transactions such as cash dispensing, while another ATM machine with the generally similar physical hardware can perform additional transactions such as bill payment by installing additional ATM software (and sometimes hardware) components.

ATMs often are manufactured with a limited set of pre-installed ATM software components with a standard set of default features. When additional features and capabilities for an existing ATM are desired, a service technician ("servicer") may access a secure chest portion of the ATM or other area where a disk drive or other media reader is located, and install additional software components which provide the additional desired functionality for the ATM. Such additional software is often installed from one or more portable mediums such as floppy disks, CD-ROMs or a hard drive.

A problem with this approach is that it may be time consuming to install new software on ATMs. A further drawback for the provider of the software is that the entity installing the copies may not pay the license fees for all the copies installed.

Approaches to software protection are sometimes used for mass market software applications such as word processors and consumer operating systems. These systems allow the manufacturer to generate and distribute thousands of copies of the exact same CD-ROM image. Unless the user has one of the activation keys, the applications will not install. However, one major drawback of this software protection method is that each activation key will work with any of the thousands of copies of the CD-ROM. With the availability of inexpensive CD-ROM writers, unlimited pirated copies of such software can be created. As long as a single valid activation key is included with each pirated CD-ROM, all of the pirated copies are fully capable of being used to install the software. Although such unauthorized copying is illegal, it is nevertheless being done throughout the world for mass market consumer applications. Consequently there exists a need for a system and method of operationally adding the functions of software components to authorized ATMs that minimizes the opportunity for the additional software components to be operated on unauthorized ATMs.

DISCLOSURE OF INVENTION

It is an object of the exemplary form of the present invention to provide an automated banking machine that may be selectively configured.

It is a further object of the exemplary form of the present invention to provide an automated banking machine that may be selectively configured by a servicer in the field.

It is a further object of the exemplary form of the present invention to provide an automated banking machine that may be selectively configured only within the parameters of a license agreement.

It is a further object of the exemplary form of the present invention to provide an automated banking machine that may be selectively configured in a manner which minimizes the opportunity for software components to be operated on additional unauthorized automated banking machines.

It is a further object of the exemplary form of the present invention to provide a system and method for configuring automated banking machines.

It is a further object of the exemplary form of the present invention to provide a system and method for selectively enabling a remote automated banking machine to be configured.

It is a further object of the exemplary form of the present invention to provide a system and method for selectively enabling a plurality of remote automated banking machines to be configured.

It is a further object of the exemplary form of the present invention to provide a system and method for selectively enabling only an authorized ATM to be configured in a manner that is consistent with an authorized set of parameters.

Further objects of the exemplary form of the present invention will be made apparent in the following Best Modes for Carrying Out Invention and the appended claims.

The foregoing objects are accomplished in an exemplary embodiment of the invention by an automated banking machine that includes output devices such as a display screen, and input devices such as a touch screen and/or a keyboard. The banking machine further includes transaction function devices such as a dispenser mechanism for sheets of currency, a printer mechanism, a card reader/writer, a depository mechanism and other transaction function devices that are used by the machine in carrying out banking transactions.

The banking machine is in operative connection with at least one computer. The computer is in operative connection with the output devices and the input devices, as well as with the sheet dispenser mechanism, card reader and other physical transaction function devices in the banking machine. The computer includes at least one software application that is executable therein. The software application includes a plurality of different software components that may be selectively configured on the machine. The software components provide the computer with the programming necessary to carry out a plurality of different transaction functions with the machine. Based on the desired functionality for the machine, one or more of the software components may be selectively configured on the ATM. As used herein, the term "configure" encompasses the processes associated with either or both of configuring so as to enable carrying out desired functions and installing so as to enable instructions to be available for use by a computer device.

Configuration of software components is enabled to be performed responsive to a set of configuration rules. The configuration rules define which of the software components and associated features and parameters may be installed or modified by a servicer of the machine. The rules may enable a limited subset of components to be configured. The rules may also enable a complete set of software components to be configured on the machine. The rules may further specify individual parameters for the configuration of the software.

In one exemplary embodiment, authorization keys associated with the machine and the configuration rules must be input by a user before the software components are enabled to be configured on a machine. In a further exemplary embodiment, a digitally signed configuration certificate must be loaded on the machine before the software components are enabled to be configured. In this exemplary embodiment the configuration rules are included in or with the digitally signed configuration certificate and the software enables the machine to be configured responsive to the configuration rules in the certificate. In a further alternative exemplary embodiment the configuration rules are retrieved by the machine from a remote database. In a further alternative embodiment the configuration rules are retrieved from a remote authorization server application in operative connection with the computer. In another exemplary embodiment the configuration rules are configured responsive to encrypted data on a physical medium such as a magnetic stripe card or a smart card. In another exemplary embodiment the configuration rules are remotely set in the machine by a remote application accessing the machine across a network.

In an exemplary embodiment, the configuration rules are securely associated with one or more specifically authorized automated banking machines in such a manner that configuration rules for one machine cannot be used for an unauthorized machine. The configuration rules may be managed by a licensing authority such as the manufacturer of the automated banking machine or any other entity charged with managing the license provisions of automated banking machine software. When a customer wishes to add additional functionality to one or more machines, the licensing authority is contacted to acquire authorization to configure existing or additional software components on the machine. In response to this communication, the licensing authority is operative to selectively enable individual machines to be configured according to an updated set of configuration rules for the machine.

These new rules may be loaded onto an authorized automated banking machine as previously described from an authorization key, digitally signed configuration certificate, and/or smart card. In other exemplary embodiments this may also be accomplished by the licensing authority configuring a database or application server with updated configuration rules correlated to specific automated banking machines. In this described exemplary embodiment, each automated banking machine is operative to contact the database or application server through a network to determine which software components are authorized to be installed and configured.

In these described exemplary embodiments, a manufacturer of automated banking machines may pre-load each machine with a complete set of software components. The software components may be loaded as part of an installed software application or may be loaded in the form of one or more setup programs which can be installed and configured as fully operative components at a later time. Although a full set of software components may be pre-loaded, the risk that certain components will be used and configured in violation of a software license will be minimized due to the security encompassed by the described authorization methods and configuration rules of the present invention.

In one exemplary embodiment, the complete set of software components is pre-loaded on a non-volatile storage medium of the machine such as a hard drive. When additional components are properly authorized as discussed previously, the components may be configured on the machine from the pre-loaded software on the hard drive. In alternative exemplary embodiments the complete set of software components may be stored on one or more portable storage mediums such as CD-ROMs.

In an exemplary embodiment of the present invention, the authorization keys or certificates include machine or customer specific information. When the configuration or installation routines are initiated, the machine or customer specific information is compared to specific attributes associated with the machine. In one exemplary embodiment the automated banking machine includes a unique physical code built into a hardware component such as the ID found in Intel Pentium III CPUs or the MAC address found in network interface cards. In another exemplary embodiment the machine may have a software based unique code such as a Terminal ID associated with the machine itself, a customer number associated with the owner of the machine, or a network ID associated with the network address of the machine.

In this described exemplary embodiment, the machine will only enable the configuration of additional software components if the machine specific information embedded in an input certificate or authorization key corresponds to the unique hardware and/or software identification information associated with the machine. In addition the machine is operative to disable the newly configured or installed software components if a user attempts to change the unique identification information on the machine to values which are inconsistent with the certificate or authorization key. These features are operative to minimize an unscrupulous user from installing the software on unauthorized machines through changes to the unique machine specific information associated with the machine.

In other exemplary embodiments, the configuration rules may be associated with at least one expiration parameter. As a result, the automated banking machine will only permit configurations and installations to take place prior to the expiration of the configuration rules. Once the rules expire, the machine will continue to operate with its current configuration of software components. However, a servicer of the machine will be unable to add additional software components and/or configure existing software components unless the machine receives additional authorization. The additional authorization may be acquired as previously discussed by contacting the licensing authority to receive an updated set of authorization keys and/or configuration rules.

In exemplary embodiments the expiration parameter may be based on a fixed date such as Dec. 31, 2005 or may be based on a relative time period such as 30 days from the first configuration/installation of the software. Also the expiration parameter may be based on other non-time based information, such as a fixed or relative number of transactions the automated banking machine performs. In a further exemplary embodiment the expiration may be triggered by the machine receiving an expiration command message from a remote server.

In one exemplary embodiment, an authorization key includes a series of alphanumeric characters. The number of these characters is in a range that is practical for a servicer to manually type into a keyboard or keypad in operative connection with an automated banking machine. The authorization keys are generated by the licensing authority using an authorization algorithm. In one exemplary embodiment the key is derived from an authorization algorithm that accepts data that is associated with the specific machine and/or the owner of the machine. In this way the generated keys are only operative to activate software for the specific owner and/or machine.

This data may include for example, a MAC address, a Terminal ID, Gateway Router ID, TCP/IP address, Computer Name, Processor ID, a Network ID, DES keys, Poll ID, Primary Phone Number, Customer Name, Customer Number, Order Number, Serial Number and/or any other unique information that is available to both the machine in the field and a licensing authority. The algorithm may also accept additional information such as the version number of the software components, an expiration parameter and/or configuration rules.

The authorization algorithm is also accessible by the configuration/installation software on the machine in a form that cannot be easily derivable by the end user. In one exemplary embodiment the authorization algorithm may be embedded in the compiled machine code of the configuration/installation software. In other embodiments the authorization algorithm may be stored in an encrypted form on the machine.

In this described exemplary embodiment, the algorithm combines the input data along with a plurality of secret data only accessible to the algorithm. The algorithm then passes the combined data through one or more one-way hash functions to produce a unique number from the combined data. The exemplary one-way hash functions are non-reversible and produce unique numbers which cannot be used to re-derive the original data. In addition, small changes to individual characters in the original data produce dramatic changes in the unique number. Examples of operative one-way hash functions for use with the present invention include MD5 and SHA algorithms.

The resulting unique number or a truncated and/or encrypted form of the unique number may then be used as an authorization key for automated banking machine software. This unique number may also be combined with additional data to form the authorization key. For example the resulting authorization key may be of the form "UJIE56IOP7H345B4-456789." Here the first portion before the hyphen ("UJIE56IOP7H345B4") may correspond to the generated unique number, while the second portion after the hyphen ("456789") may represent one or more of the original values used to generate the unique number such as a Terminal ID, a Customer ID, an Order ID, an expiration parameter, or a numeric representation of the configuration rules.

Prior to enabling software to be configured and/or installed, the software is operative to present the user with a screen which prompts the user to enter the authorization key. If the key was derived from an additional machine or customer specific data that has not been included as a portion of the authorization key (such as the previously described second portion of the authorization key), the software will prompt the user to enter this information as well. If the key is derived from fixed hardware embedded information such as a MAC address or processor ID, the software may retrieve this information from the hardware directly rather than prompting the user for the information.

Once machine and/or customer specific information has been gathered, the software is operative to calculate a unique number using the previously described authorization algorithm and the gathered data. The resulting number may then be compared to the authorization key entered by the user. If the calculated number corresponds to the input authorization key, the software enables the user to configure the software components. If the calculated number does not correspond to the input authorization key, the software will not enable the user to configure the software components. In addition, if the authorization key was derived from data representative of configuration rules, the software is operative to proceed with the configuration responsive to the configuration rules.

As discussed previously, a digitally signed certificate may also be used to securely authorize a specific configuration for an automated banking machine. The certificate may include information that specifies the configuration rules for a plurality of automated banking machines. This certificate may then be digitally signed by the licensing authority using a private key according to a cryptographic electronic signature process.

The certificate may then be installed locally on each automated banking machine, or may be loaded on a server in operative connection with one or more banking machines. The configuration software is operative to authenticate the digital signature and certificate by using a public key associated with the licensing authority. In the exemplary embodiment, the public key of the licensing authority is embedded in the software in a form that cannot be easily modified by a user. If the certificate is authenticated, the software enables the configuration of the software components on the machine to continue responsive to the configuration rules of the certificate. If the certificate is not authenticated, the software is not enabled to continue with the configuration of the machine. If the certificate includes configuration rules for a plurality of automated banking machines, the software is operative to configure the machine responsive to only that set of configuration rules that corresponds to the machine.

To correlate each machine to the proper set of configuration rules, each set of configuration rules in a certificate may include a unique machine specific hardware or software identification value. If the software cannot find a set of configuration rules in a certificate that corresponds to the machine being configured, the software will not enable the configuration of the machine to continue. After a machine has been configured, if a user attempts to change the unique machine specific hardware or software identification values on the machine itself, the software may be operative to either prevent the values from being modified or to disable the machine until the values are either changed back or a new certificate is loaded which includes authorized configuration rules for the corresponding changed values.

In an exemplary embodiment, newly manufactured automated banking machines may include an authorization certificate that corresponds to the license agreement associated with the purchase of the machines. If the terms of the license agreement are modified at a later time, a new certificate may be generated which corresponds to the new or updated license agreement. This new certificate may then be loaded on the machines or placed on a server which can be accessed by one or more machines through a network. The automated banking machine may then be re-configured according to the new certificate and the configuration rules associated therewith. In the exemplary embodiment the certificate also includes expiration parameters as previously described. After a certificate expires, the machines will continue to operate, however changes to portions of their configuration will not be permitted until an updated certificate is acquired from the licensing authority.

BEST MODES FOR CARRYING OUT INVENTION

Figure 1:
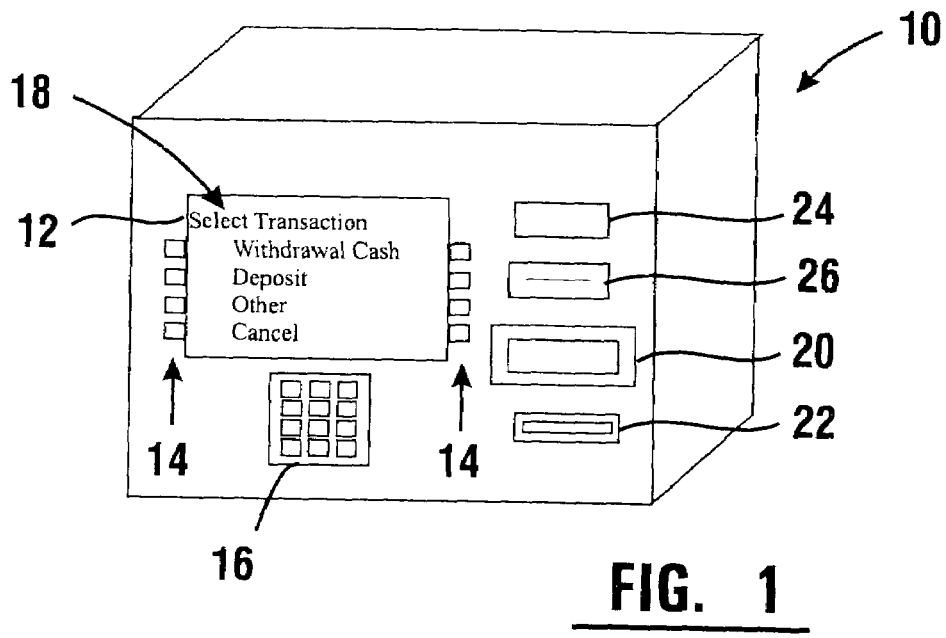
FIG. 1 is a perspective view representative of an exemplary automated banking machine including features of an exemplary embodiment of the present invention.

Referring now to the drawings and particularly to FIG. 1, there is shown therein a perspective schematic view of an automated banking machine or ATM 10 of one exemplary embodiment of the present invention. The exemplary automated banking machine 10 includes at least one output device such as a display device 12 that is operative to provide a consumer with a user interface 18 that includes a plurality of selectable options for operating the machine. The exemplary embodiment may further include other types of output devices such as speakers, or any other type of device that is capable of outputting a visual, audible, or other sensory perceptible information.

The exemplary automated transaction machine 10 includes a plurality of input devices such as function keys 14, a keypad 16 and a card reader 26. The exemplary embodiment may further include other types of input devices such as microphones, cell phone or PDA interfaces or any other device that is operative to provide the machine with inputs representative of consumer communication. The automated banking machine 10 further includes a plurality of additional transaction function devices that enable the machine to perform transactions. Examples of such additional transaction function devices include a sheet or cash dispenser 20, depositor 22, and receipt printer 24. Of course, in other embodiments other or different types of transaction function devices may be included in or in operative connection with the banking machine.

Figure 2:
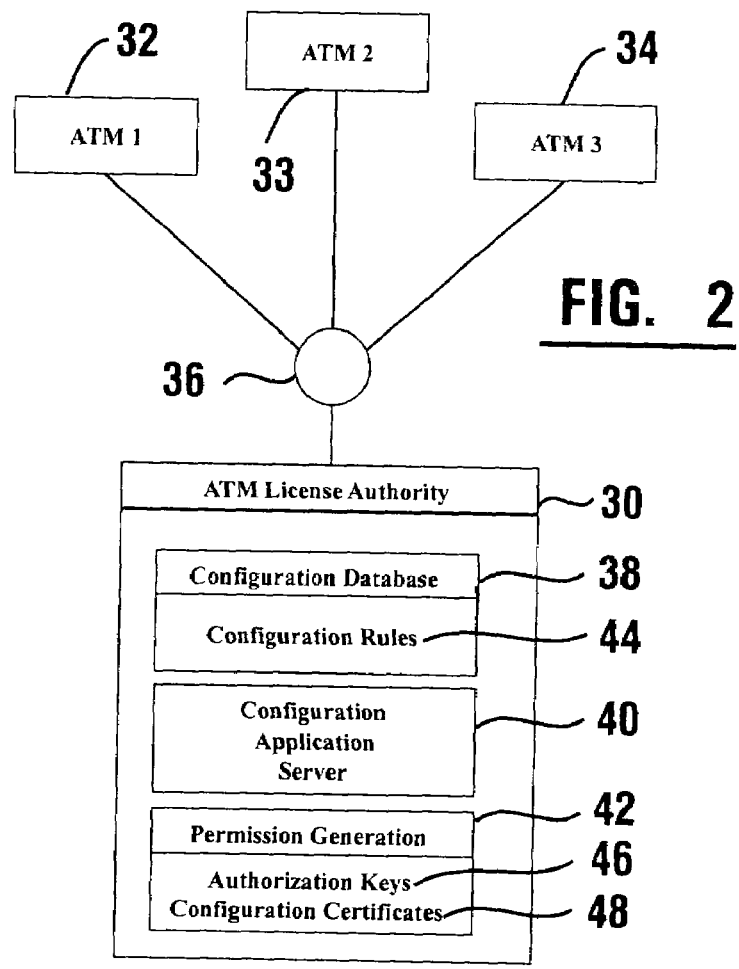
FIG. 2 is a schematic view representative of an exemplary configuration and authorization system for automated banking machines of the present invention.

FIG. 2 is representative of a schematic view of a system employing an exemplary embodiment of the present invention. The system includes an ATM licensing authority schematically indicated 30. The ATM licensing authority is operative to selectively provide a plurality of ATMs 32, 33, and 34 with permission to configure one or more software components on each ATM. In the exemplary embodiment, permission for configuring an ATM is embodied in a plurality of configuration rules 44. The configuration rules 44 may for example specify which of a plurality of software components may be installed on each ATM. The configuration rules 44 may further specify which of a plurality of different parameters may be used to set up each software component. The configuration rules 44 may also specify which of a plurality of software features or functions are operative to be enabled or disabled in each software component. Other or different parameters or attributes may also be included.

In one exemplary embodiment the licensing authority 30 is in operative communication with the ATMs 32, 33, and 34. Such communication may be accomplished through a private or public network schematically indicated 36. The licensing authority may include a configuration application server 40 which is operative to provide a set of configuration rules 44 for each ATM. These sets of configuration rules may be stored for example in at least one data store 38 which is in operative connection with the configuration application server 40. In this described exemplary embodiment, each ATM is operative to communicate with the configuration application server 40 to retrieve the configuration rules associated with the ATM. Each ATM is then enabled to be configured responsive to the retrieved configuration rules.

In one exemplary embodiment, the configuration rules are retrieved each time an authorized servicer attempts to modify the configuration of an ATM. In another exemplary embodiment the configuration rules are associated with at least one expiration parameter such as an expiration date, an expiration time period, or some other criteria for triggering the expiration of the configuration rules. In response to the configuration rules expiring, an ATM may be operative to contact the licensing authority 30 to retrieve an updated set of configuration rules.

In another exemplary embodiment the licensing authority may initiate communication with each ATM through the network 36 or other communication link. For example, when a set of configuration rules for an ATM is about to expire, the licensing authority may proactively forward to the ATM a new set of configuration rules. In addition, if the ATM is being upgraded, the licensing authority may proactively forward to the ATM a new set of configuration rules that correspond to the upgrade.

In another exemplary embodiment the licensing authority may include a mechanism such as a software application 42 for selectively generating permissions for ATMs. Such a software application may be operative to generate and store configuration rules for individual ATMs in the configuration database 38. Such a software application 42 may further be operative to generate and forward the configuration rules directly to individual ATMs through the network 36 or other communication path. In another exemplary embodiment the software application 42 may be operative to generate one or more authorization keys 46 and/or configuration certificates 48 which are selectively operative to enable the configuration of targeted ATMs.

An authorization key 46 or configuration certificate 48 may include the previously described configuration rules embedded therein. In one exemplary embodiment, authorization keys or configuration certificates may be forwarded to one or more ATMs through the network 36. Alternatively, the authorization keys or configuration certificates may be saved to or printed on a portable storage medium such as a floppy disk, CD-ROM, smart card, magnetic stripe card, or software license and physically transported to an ATM. In this described exemplary embodiment a servicer may manually input an authorization key or configuration certificate by typing information into a keypad of the ATM or otherwise providing such data through an input device on the ATM. Alternatively, the servicer may input an authorization key or a configuration certificate by reading the authorization key or configuration certificate with a portable medium reader such as a card reader, a floppy disk reader, a CD-ROM reader, or a scanner that is in operative connection with the ATM.

Figure 3:
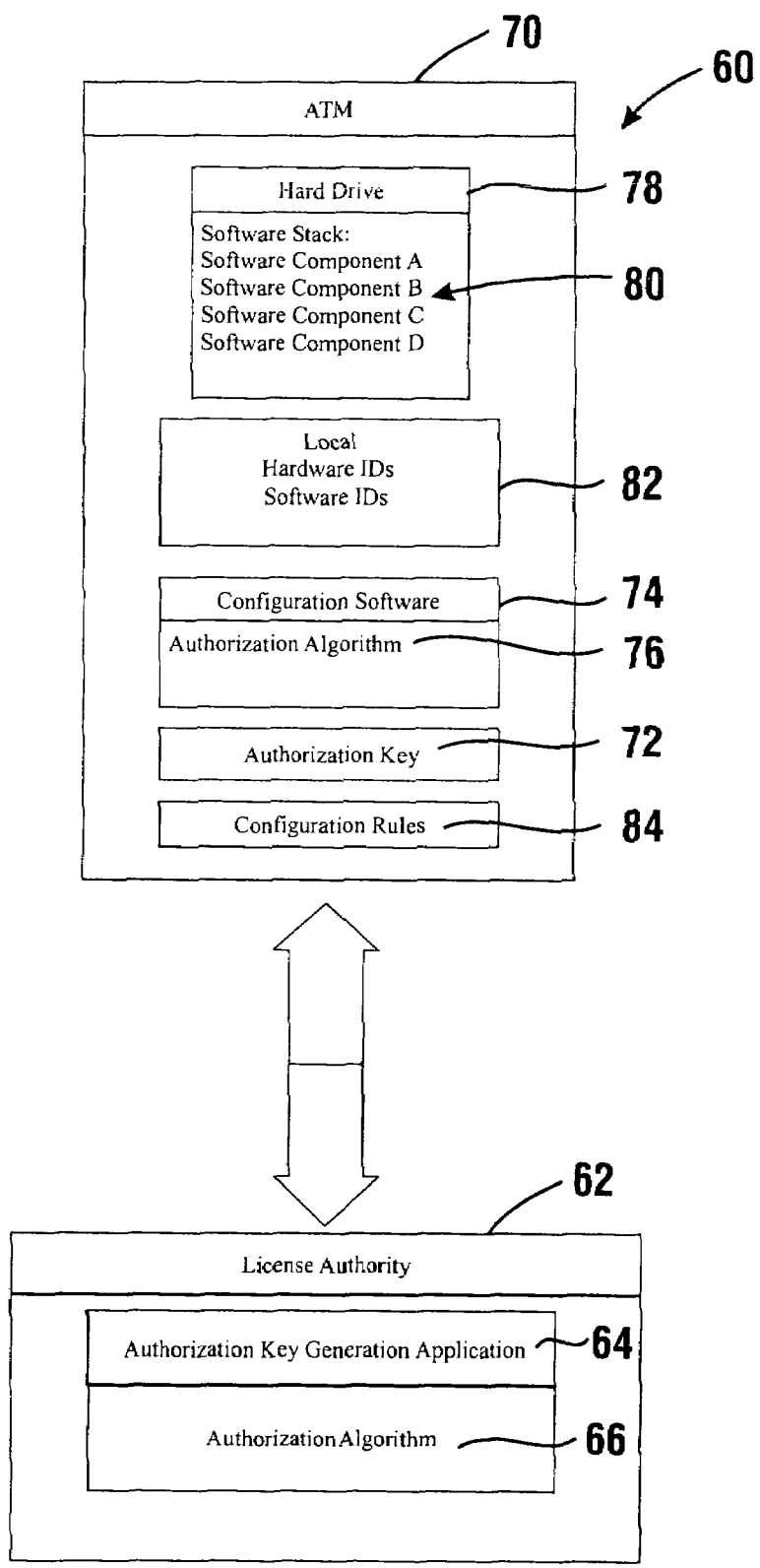
FIG. 3 is a schematic view representative of an exemplary system for authorizing the configuration of automated banking machines with authorization keys.

FIG. 3 shows a schematic view of an exemplary system 60 for authorizing the configuration of ATMs using an authorization key. Here the licensing authority 62 operates an authorization key generation application 64. The key generation application 64 includes an authorization algorithm 66 that is operative to produce a first authorization key responsive to information associated with an individual ATM 70. In the exemplary embodiment the first authorization key 72 is required to be input into a configuration software program 74 to enable the configuration software to configure the ATM 70. The exemplary configuration software 74 includes an authorization algorithm 76 that corresponds to the authorization algorithm 66 of the key generation application 64.

The authorization algorithm 76 is operative to produce a second authorization key responsive to information associated with the ATM 70. The configuration software 74 is operative to validate the input first authorization key by comparing it to the generated second authorization key. If the keys match, the configuration software 74 enables the configuration of the ATM 70 to proceed. If the keys do not match, the configuration of the ATM 70 is not allowed to proceed.

In one exemplary embodiment the ATM 70 includes at least one local data store 78, such as a hard drive or non-volatile storage device. The data store includes a plurality of pre-installed software components 80. The software components 80 may include individually installable ATM applications which are enabled to be installed responsive to a valid authorization key 72. In addition or in the alternative, the software components 80 may comprise different features or functions of a single ATM software application. Such features may be individually enabled for use responsive to a valid authorization key 72. In alternative exemplary embodiments the software components may be installed from a portable storage medium such as a CD-ROM or from a URL address on a network that is accessible to the ATM.

The exemplary ATM 70 is associated with one or more identification values. Such values may be embedded in individual hardware components of the ATM 70 such as the MAC address of a network card or the processor ID of a CPU. The identification values may also include configuration data or parameters stored by the configuration software 74 or one of the software components 80. Examples of software based parameters include a Terminal ID, Gateway Router ID, TCP/IP address, Computer Name, a Network ID, DES keys, Poll ID, Primary Phone Number, Customer Name, Customer Number, Order Number, Serial Number and/or any other unique information that may be associated with the ATM.

By generating an authorization key from hardware or software based identification values associated with the ATM 70, the key becomes linked to the specific ATM 70 and is not operative to enable the configuration of unauthorized ATMs. In addition, the exemplary ATM 70 is operative to monitor the hardware or software based identification values for changes after the ATM 70 has been configured. Consequently, if a user attempts to alter identification values 80 by swapping out hardware components or by changing software based parameters such as a Terminal ID, the ATM 70 is operative to detect that the altered identification values are inconsistent with input authorization key 72. When an inconsistency is detected, the ATM 72 may be operative to disable one or more software components 80 until either the identification values 80 are changed back or a new authorization key is entered which is consistent with the changed identification values.

In a further exemplary embodiment the authorization key may also be generated responsive to a plurality of configuration rules. Configuration rules 84 associated with the ATMs may be operative to specify a specific configuration for the ATM 70 such as which of the software components 80 may be installed or enabled on the ATM or what parameters may be set in the software components. Such an exemplary ATM is operative to only enable a configuration of the ATM that is consistent with the configuration rules used to generate the authorization key. If configuration rules 84 associated with the ATM 70 do not correspond to the input authorization key 72, the ATM will not permit the configuration of the ATM to continue.

Figure 4:
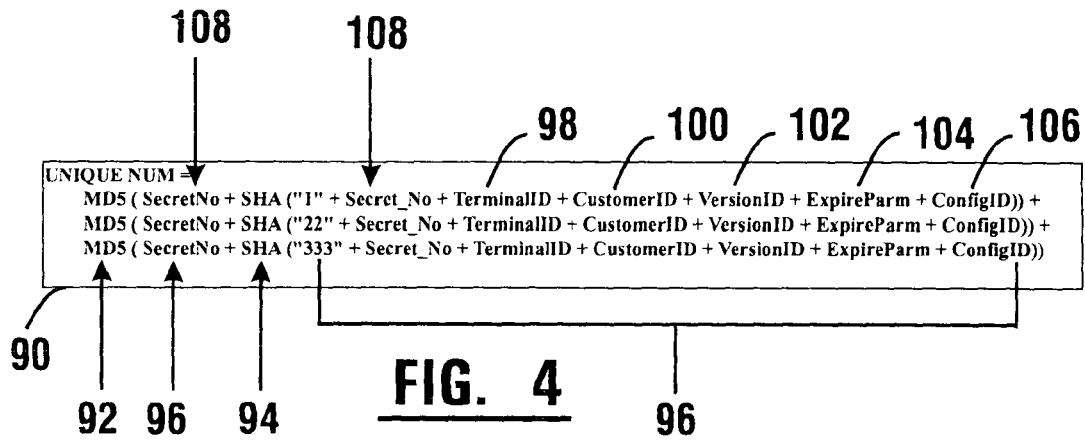
FIG. 4 is a schematic view representative of an exemplary algorithm for the generation of authorization keys for automated banking machines.

FIG. 4 shows one exemplary authorization algorithm 90 that may be used with the present invention to generate and validate authorization keys. The algorithm includes a plurality of one-way hash functions such as MD5 and SHA algorithms that are operative to generate non-reversible hashes or numbers from a plurality of combined arguments to the algorithms. The non-reversible hashes have the characteristic that they cannot be manipulated to re-derive the original arguments. In addition, the exemplary embodiment of the algorithm uses a combination of two or more different types of one-way hash functions to reduce the likelihood that the authorization keys may be compromised due to a flaw in any one of the one-way hash functions.

In this described exemplary authorization algorithm the arguments include hardware and/or software based identification values which are associated with a specifically authorized ATM such as a Terminal ID 98 and a Customer ID 100. The arguments also include a Version ID 102, Expiration Parameter 104, and a Configuration ID 106. The Version ID 102 corresponds to the version number for the configuration software and/or the software components that are authorized to be installed on the ATM with authorization keys generated by the algorithm 90. The Expiration Parameter 104 includes a value representative of a fixed date, a relative time period, or some other criteria for determining when the authorization key expires. The Configuration ID 106 is representative of one or more of a plurality of different configurations which are enabled by the authorization key generated by the authorization algorithm 90. The Configuration ID 106 may correspond for example to a particular set of configuration rules, parameters, and/or authorized software components.

The exemplary arguments to the algorithm 90 also include one or more secret numbers 108 that are operative to further increase the difficulty in reverse engineering the authorization algorithm by comparing an authorization key to any potentially publicly available arguments used to generate the authorization key. In addition, the secret numbers may change with each different version of the ATM configuration software, so that even if the form of the authorization algorithm were derived through accidental public disclosure or through hacking, authorization keys for different ATM software components or different versions of ATM configuration applications will still be secure.

As discussed previously in connection with FIG. 3, both the key generation application 64 of the licensing authority 62 and the configuration software 74 of the ATM 70 include matching authorization algorithms. To further prevent the authorization algorithm from being reverse engineered by evaluating the configuration software machine code, exemplary embodiments of the present invention may be operative to encrypt the secret number or embed the secret number in the machine code of the configuration software in such a manner that the secret number is not easily derivable by viewing or decompiling the configuration software machine code.

Figure 5:
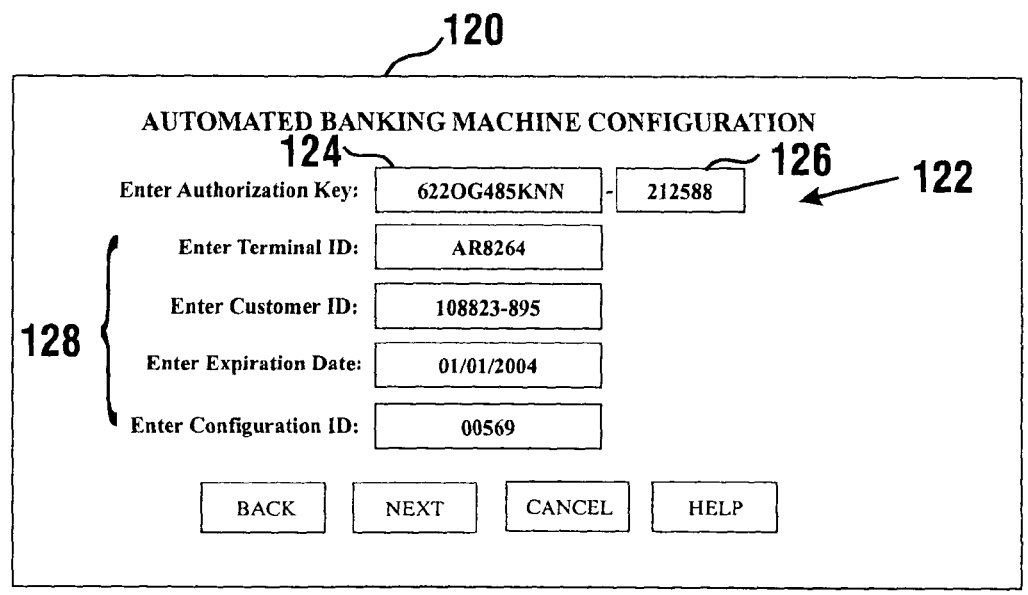
FIG. 5 is representative of an exemplary application interface screen for entry of an authorization key for an automated banking machine.

FIG. 5 shows an exemplary ATM user interface configuration setup screen 120 that is operative to prompt a servicer to input an authorization key 122 prior to enabling a configuration of an ATM to continue. Here the authorization key 122 includes multiple parts such as a first portion 124 and a second portion 126. The first portion 124 corresponds to the non-reversible output of the previously described authorization algorithm 90. The second portion 126 corresponds to one or more of the arguments to the authorization algorithm 90 that were used to generate the first portion 124.

As discussed previously the exemplary configuration software of the ATM derives an expected authorization key from software or hardware based identification values available to the ATM. This derived authorization key is then compared to the authorization key 122 that has been input by a servicer. Correspondence of the keys indicates that the arguments used to generate both keys are the same. Thus the configuration is allowed to continue. However, not all of the arguments to the authorization algorithm may be previously stored on the ATM, thus the configuration software may be operative to prompt the servicer for this information. In this exemplary embodiment the second portion of the authorization key corresponds to one or more of these configuration parameter arguments that may not be previously stored on the ATM. For example the second portion 126 may correspond to configuration parameters such as the Terminal ID 98, Customer ID 100, Version ID 102, Expiration Parameter 104, and/or Configuration ID 106.

In addition the exemplary configuration screen 120 may prompt the servicer to enter one or more of these configuration parameters in their own individually labeled entry fields 128. To assist a servicer in entering the correct information, both the authorization key and configuration parameters may be printed on a license document generated by the licensing authority. Also the authorization key and arguments may be printed as a scannable bar code or other readable indicia, or saved in a computer file that may be manually loaded or automatically input into the ATM configuration software.

In some exemplary embodiments, if one or more of the required configuration parameters have been previously entered during a previous configuration, the configuration software may be operative to automatically retrieve and insert these parameters in entry fields 128 of the configuration screen 120. The configuration parameters may be left unchanged by the servicer, if they continue to correspond to the entered authorization key 122. However, if the configuration parameters which correspond to the new authorization key 122 are different, then the servicer may enter the correct configuration parameters in the entry fields 128. In addition, if the attributes used to generate the authorization key include hardware embedded identification value such as a MAC address or Processor ID, such values may be automatically retrieved from the hardware by the configuration software without prompting the servicer to enter them.

Figure 6:
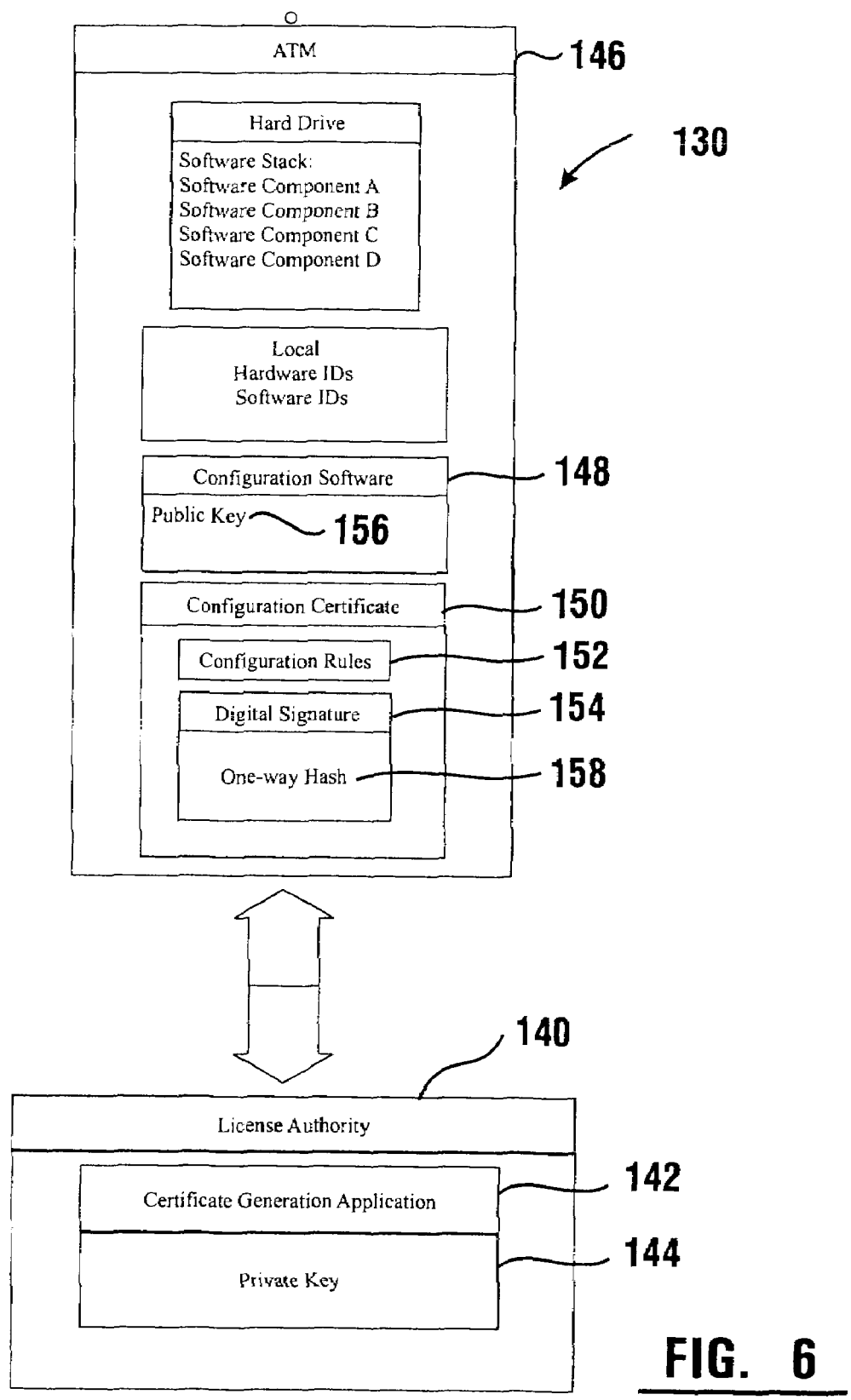
FIG. 6 is a schematic view representative of an exemplary system for authorizing the configuration of automated banking machines with digitally signed configuration certificates.

FIG. 6 shows a schematic view of an exemplary system 130 for authorizing the configuration of ATMs with a digitally signed configuration certificate. Here the licensing authority 140 operates a certificate generation application 142. An exemplary certificate 150 generated by the application 142 includes configuration rules 152 for one or more specific ATMs 146. The application 142 is operative to digitally sign the configuration certificate using a private key 144 associated with the licensing authority 140.

In the exemplary embodiment the configuration certificate 150 generated by the licensing authority 140 may be used to enable one or more ATMs 146 to be configured according to the configuration rules 152 associated with the certificate 150. Such a certificate may be loaded on the ATM 146 from a portable storage medium such as a floppy disk, CD-ROM, or card. The configuration certificate 150 may further be downloaded through a network connection from the licensing authority 140 or from some other networked database or storage device.

The exemplary configuration software 148 of the ATM 146 is operative to authenticate the configuration certificate 150 using digital signature authentication techniques. In one exemplary embodiment the configuration software 148 of the ATM 146 includes a public key 156 that corresponds to the private key 144 of the licensing authority 140. The public key 156 is used by the configuration software 148 to unencrypt the digital signature 154 that is associated with the certificate 150. The unencrypted form of the digital signature 154 includes an original one-way hash 158 of the original configuration certificate. The configuration software is operative to generate another one-way hash of the received configuration certificate 150. This generated hash of the certificate may then be compared to the unencrypted original hash of the certificate 158. If the original and generated hashes correspond, the configuration software 148 is operative to enable the ATM 146 to be further configured responsive to the configuration certificate 150 and configuration rules 152.

In one exemplary embodiment the public key 156 is embedded in the machine code of the configuration software 148. In exemplary embodiments the public key 156 may be associated with the configuration software in such a manner that the public key may not be easily altered or modified without detection. If an alteration is detected, the exemplary configuration software may be operative to disable itself.

Figure 7:
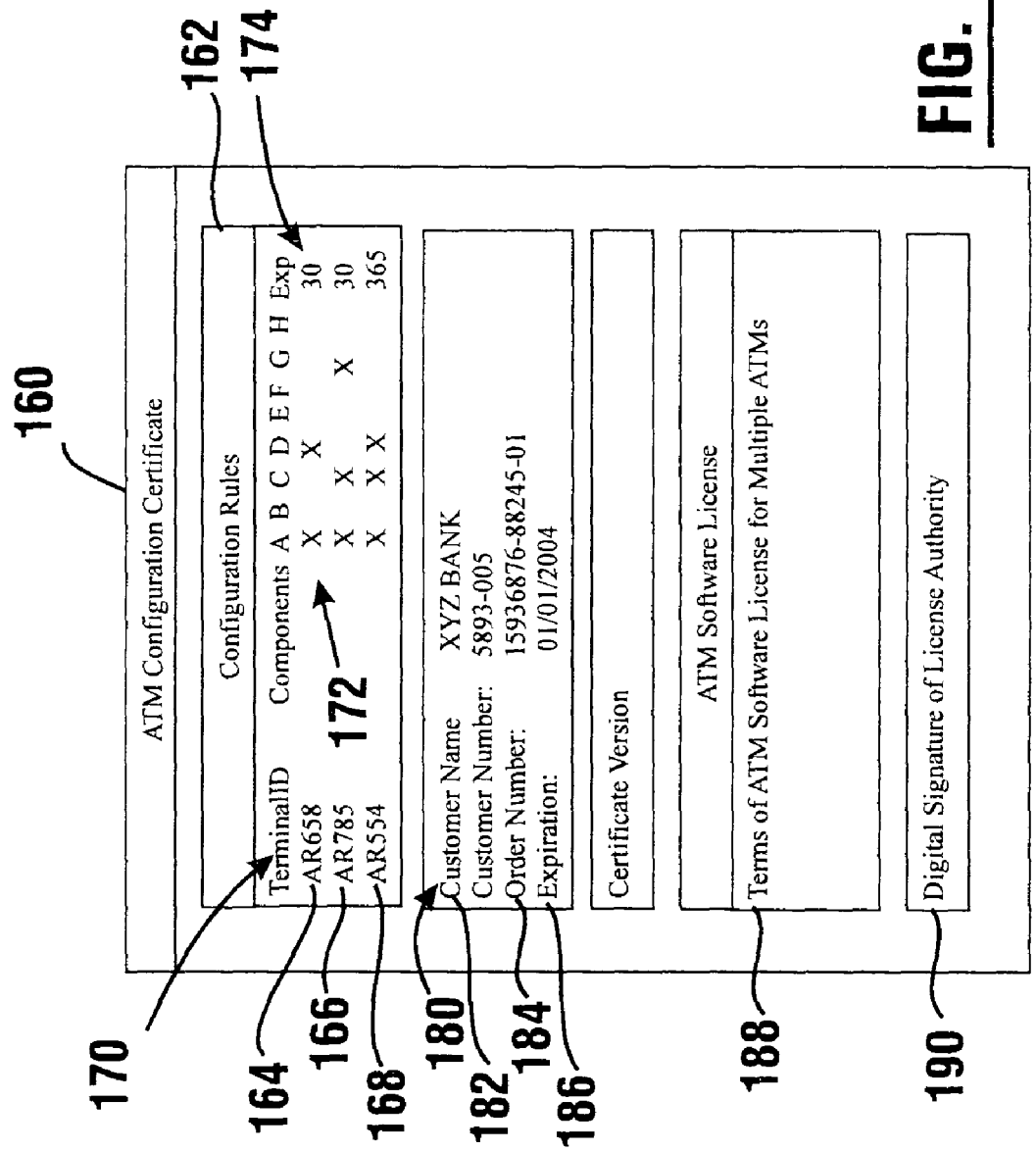
FIG. 7 is a schematic view representative of an exemplary digitally signed configuration certificate for automated banking machines.

FIG. 7 shows an exemplary configuration certificate 160. As discussed previously an exemplary configuration certificate 160 includes a digital signature 190 of the licensing authority and a plurality of configuration rules 162. In the exemplary embodiment the configuration rules 162 include a plurality of sets of rules 164, 166, and 168 which correspond to different ATMs. In this described embodiment each set of configuration rules includes a Terminal ID value 170 and a plurality of configuration parameters 172 which specify how an ATM with the associated Terminal ID may be configured. Here the configuration parameters 172 include a reference to which ATM software components among a plurality of software components may be installed on the ATM. In other embodiments the configuration parameters may specify other configuration characteristics including specific attributes used in the configuration of each software component or any other configuration information that may be used to setup, install, and configure software and hardware of an automated banking machine of the present invention. The configuration parameters may further include one or more expiration parameters 174 which indicate the triggering date, time period, or other event that will cause a corresponding set of configuration rules to expire.

Alternative embodiments of the configuration rules may further include other ATM specific values such as a hardware/software specific MAC address, Processor ID, Gateway Router ID, TCP/IP address, Computer Name, a Network ID, DES keys, Poll ID, Primary Phone Number, Customer Name, Customer Number, Order Number, Serial Number and/or any other unique information that may be used to associate specific sets of configuration rules to specific automated banking machines.

The exemplary configuration certificate 160 may further include group information 180. Such group information 180 may include customer, owner, or operator specific information 182 for the ATMs associated with the certificate. The group information 180 may further include an order number 184 for the ATMs associated with configuration certificate 160. Also the group information 180 may include an expiration parameter 186 that specifies a date, time period, or other event that will trigger the expiration of all of the configuration rules associated with the certificate 160.

The exemplary configuration rules and group information is stored in a format on the configuration certificate that is operative to be read by the configuration software. Such a format may or may not be easily read by a human. Consequently, the exemplary configuration certificate 160 may further include a text portion 188 that may be easily read by humans. The text portion 188 may include the text of the ATM software license agreement. The text portion 188 may further include a summary of the configuration certificate and the software packages that may be enabled on specific ATMs using the certificate.

The exemplary configuration software of an ATM is operative to display the textual portion 188 during the configuration process. After presenting such textual information to a servicer, the configuration software may for example prompt the servicer to affirmatively accept the license terms included in the textual portion before enabling the ATM to be configured responsive to the configuration certificate.

Figure 8:
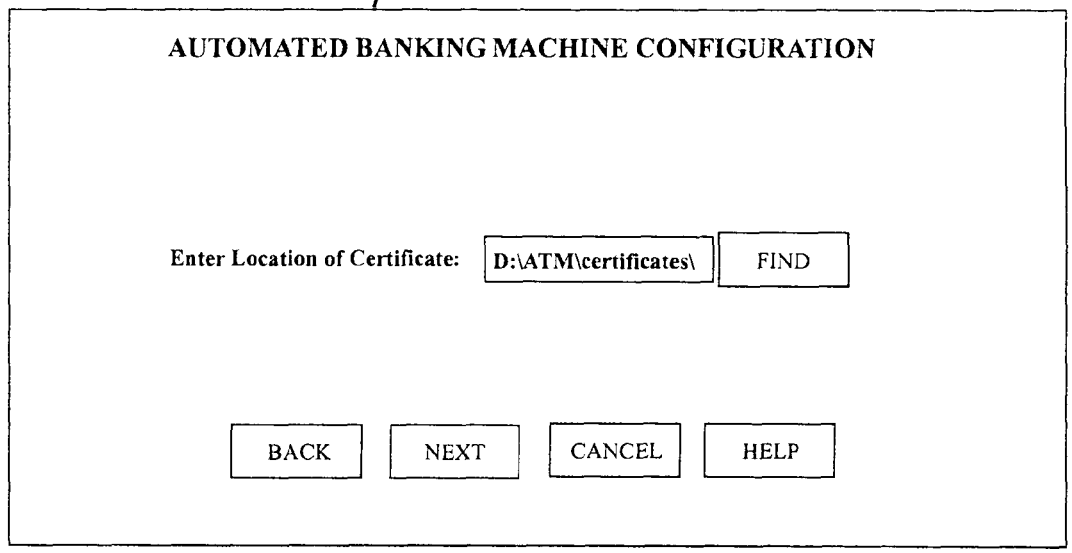
FIG. 8 is representative of an exemplary application interface screen for entering the location of a digitally signed configuration certificate for an automated banking machine.

FIG. 8 shows an exemplary ATM user interface configuration setup screen 192 that may be generated by exemplary ATM configuration software. Here the screen 192 is operative to prompt a user of the software to enter the location of a configuration certificate. As discussed previously, such a certificate may be retrieved from a portable storage medium, a networked storage drive, a database, a URL, or from any other storage location that may be placed in operative connection with the ATM.

Once the certificate has been selected, the configuration software of the ATM is operative to authenticate the certificate by evaluating the digital signature associated with the certificate. If the certificate is authentic and has not expired, the configuration is enabled to proceed. For configuration certificates that include configuration rules associated with hardware embedded values, the configuration software is operative to retrieve the hardware specific values from the ATM hardware. If the retrieved hardware specific values correspond to the hardware specific values of the certificate, the configuration is further enabled to proceed. When the certificate includes a set of configuration rules for more than one ATM, the configuration software is operative to configure the ATM responsive to the set of configuration rules that correspond to the retrieved hardware embedded values.

For configuration certificates that include software based machine specific configuration parameters such as a Terminal ID, the configuration software is operative to configure the ATM with the machine specific configuration parameters. If at a later time a user attempts to alter the machine specific information, the exemplary ATM is operative to detect the change and disable one or more components of the ATM until the information is changed back or a new configuration certificate is selected.

Figure 9:
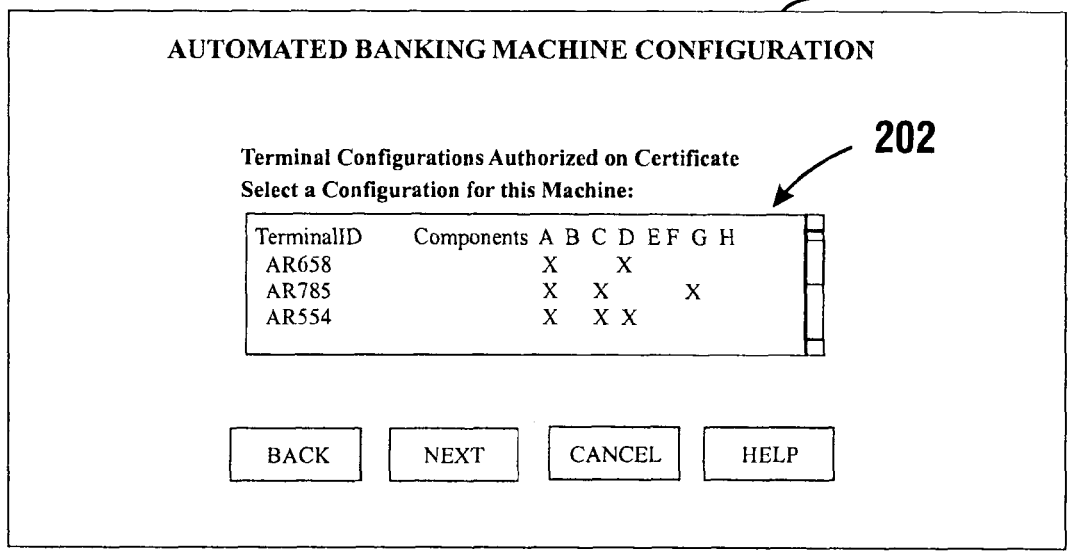
FIG. 9 is representative of an exemplary application interface screen for selecting one of a plurality of different terminal configurations that are specifically authorized in a digitally signed configuration certificate.

FIG. 9 shows a further exemplary ATM user interface configuration setup screen 200. The exemplary configuration software is operative to present screen 200 when the certificate includes sets of configuration rules for two or more ATMs. The exemplary screen 200 includes a listing 202 of terminal configurations that may be used to configure an ATM. Such a listing may include for example the Terminal ID and the software components that may be installed for each set of configuration rules. The configuration software is operative to enable the ATM to be configured responsive to which set of configuration rules is selected by the servicer.

In alternative exemplary embodiments of the present invention, ATM configuration software may use a combination of authorization keys and digital certificates to enable configuration software. Such an exemplary embodiment for example may include one or more authorization keys in a digitally signed certificate. Other embodiments of the invention will be apparent to those having skill in the art from the foregoing description of the exemplary embodiments.

In alternative exemplary embodiments ATMs may be operative to contact the licensing or other tracking authority on a programmed basis for purposes of obtaining authorization. For example, the ATM may be programmed to communicate with a license authority to provide information such as configuration parameters. The license authority may review this information for purposes of determining if the ATM software has been properly licensed for use on the particular ATM. If the ATM has not been licensed to operate the software and/or the indicated software configuration, the licensing authority may take appropriate steps to collect the appropriate fees form the ATM operator.

In some embodiments, the ATM contacting such a license authority may receive at least one authorization value from the license authority. The at least one authorization value may be operative to enable the ATM to continue to operate. Such continued operation may be allowed responsive to the at least one authorization value for a period of time or only until the next time the ATM is programmed to contact the license authority. Alternatively, the license authority may set or change an expiration date or other parameter which will cause the ATM to stop operating. For example, if the ATM is not licensed for the indicated configuration, the ATM may receive instructions to shut down in a certain period of time if the ATM does not receive other instructions or authority to keep the ATM operating beyond such time.

The authorization values or other data sent by the license authority may in some embodiments cause the processor in the ATM to operate so as to send one or more status messages to the ATM operator advising the ATM operator of the fact that the machine will cease to operate unless action is taken such as paying appropriate license fees. Such messages may in some systems produced by the ATM in a manner similar to status messages that indicate malfunctions or other conditions at the ATM. Alternatively the ATM may route the message to a network address programmed in the ATM for purposes of receiving administrative notices. The license authority may also send or cause to be sent to the entity responsible for the ATM, notices related to the condition. In this exemplary embodiment, if the authorization is properly obtained prior to the time the ATM would otherwise cease operation, the license authority or other entity may provide or change the at least one authorization value or ATM parameters so that the ATM may keep operating.

In alternative embodiments if it is determined by the license authority that the ATM configuration is not authorized, the ATM may be provided with one or more values or instructions which cause the ATM to cease operation. Alternatively or in addition, in some embodiments ATMs may be programmed so that if the ATM is unable to contact the license authority or similar entity, or if the ATM cannot verify the identity of the a license authority, or if the data for contacting the license authority is changed or corrupted in the ATM, the ATM may discontinue operation. In some embodiments this may happen right away and in other embodiments the ATM operator may be given notice through the ATM or otherwise, before the ATM ceases operation. Of course these approaches are exemplary and in other embodiments other approaches may be used.

Exemplary forms of the present invention enable owners of ATM software to reduce the risk of unauthorized use of software. This may be achieved in some embodiments by only allowing software to be configured on a designated machine. Alternatively, embodiments of the invention may enable a user to initially configure the software on selected machines, but to only enable continued operation of the software if the ATM receives appropriate authorization values or other data from a license authority. Such embodiments of the invention may have advantages as the ATM operator may avoid the need to obtain advance authorization to configure the software on additional ATMs. Rather the ATMs may contact the license authority so as to give notice of the installation and obtain the necessary one or more authorization values to achieve or continue authorization. In some embodiments the license authority may then invoice the ATM operator for the fee. If the ATM operator fails to pay appropriate fees or denies responsibility, the license authority will cause the ATM to cease operation.

Some embodiments may enable the license authority to collect data on ATMs and keep track of the operation and use being made of each authorized copy of software. This enables the license authority to utilize the data to properly assess license and/or software support fees. In some situations, the software in the ATM may be operative to keep track of the functions performed, the time of operation, number of transactions conducted or other data or combinations thereof, so as to enable the software operator to pay fees based on use. Alternatively and/or in addition, in some embodiments ATM software may be made readily available reducing the need for advance payment and/or license formalities. This may be accomplished for example, because each software copy may require for configuration in an ATM, initial and/or periodic authorization from the license authority. This may be implemented by requiring the person wishing to operate the software to include identifying or other information as part of or in addition to configuration data that is provided to the license authority. Such data may include operator contact, location, billing information or other data. In some embodiments such data may include data enabling access to the operator's account or other source of funds from which payment of license and/or support fees can be made. In this way the license authority or other operating entity can assure that payment is received before initiating and/or continuing software operation. Of course these approaches are exemplary and in other embodiments other approaches may be used.

Thus the new automated banking machine configuration method and system of the present invention achieves at least one of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method for configuring a cash dispensing automated teller machine (ATM) comprising:
   a) receiving at least one digitally signed certificate through operation of the ATM, wherein the ATM includes a cash dispenser and at least one processor, wherein the at least one certificate includes at least one serial number;
   b) verifying through operation of the at least one processor that the at least one serial number included in the at least one certificate corresponds to at least one serial number associated with at least one hardware device of the ATM;
   c) responsive to (b), configuring the ATM through operation of the at least one processor responsive to the at least one digital certificate.

2. The method according to claim 1, wherein the at least one certificate includes at least one digital signature; and further comprising:
   d) prior to (c) authenticating the at least one digital signature through operation of the at least one processor;
   wherein (c) is carried out responsive to (b) and (d).

3. The method according to claim 2, wherein (a) includes receiving the at least one certificate from a server in operative connection with the ATM through a network.

4. The method according to claim 3, wherein the at least one hardware device corresponds to at least one of a keypad, a card reader, the cash dispenser, a printer, a depositor, a CPU, and a network device.

5. The method according to claim 3, wherein prior to (c) the ATM is not enabled to perform at least one transaction function involving the operation of the at least one hardware device, wherein in (c) configuring the ATM includes enabling the ATM to perform the at least one transaction function involving the operation of the at least one hardware device.

6. The method according to claim 5, wherein in (c) the at least one transaction function includes dispensing cash, wherein further comprising:
   e) dispensing cash from the ATM through operation of the cash dispenser.

7. The method according to claim 3, wherein (c) includes configuring the ATM responsive to at least one key provided in the at least one certificate.

8. A method for configuring an automated banking machine comprising:

a) receiving a certificate through operation of the automated banking machine, wherein the certificate includes a digital signature;
b) authenticating at least one digital signature associated with the certificate through operation of the automated banking machine responsive to a public key of a licensing authority; and
c) configuring the automated banking machine responsive to the certificate and authentication of the at least one digital signature in (b), including installing at least one software component on the automated banking machine.

9. A method for configuring an automated banking machine comprising:
a) receiving a certificate through operation of the automated banking machine, wherein the certificate includes a plurality of sets of configuration rules, each set corresponding to at least one of a plurality of automated banking machines;
b) authenticating at least one digital signature associated with the certificate through operation of the automated banking machine; and
c) configuring the automated banking machine responsive to at least one set of configuration rules included in the certificate and authentication of the at least one digital signature in (b).

10. A method for configuring an automated banking machine comprising:
a) receiving a certificate through operation of the automated banking machine, wherein the certificate includes an expiration parameter;
b) authenticating at least one digital signature associated with the certificate through operation of the automated banking machine;
c) configuring the automated banking machine responsive to the certificate and authentication of the at least one digital signature in (b);
d) determining through operation of the automated banking machine responsive to the expiration parameter that configuration of the software on the automated banking machine is not authorized; and
e) preventing configuration of software on the automated banking machine responsive to the determination in (d).

11. A method for configuring an automated banking machine comprising:
a) receiving a certificate through operation of the automated banking machine, wherein the certificate includes an identification value unique to the automated banking machine;
b) authenticating at least one digital signature associated with the certificate through operation of the automated banking machine; and
c) configuring the automated banking machine responsive to the certificate and authentication of the at least one digital signature in (b).

12. A method for configuring an automated banking machine comprising:
a) receiving a certificate through operation of the automated banking machine, wherein the certificate includes a terminal identification value;
b) authenticating at least one digital signature associated with the certificate through operation of the automated banking machine; and
c) configuring the automated banking machine responsive to the certificate and authentication of the at least one digital signature in (b), including associating the automated banking machine with the terminal identification value.

13. The method according to claim 11, further comprising prior to (c):
determining through operation of the banking machine that the identification value corresponds to a hardware embedded identification value in the banking machine.

14. The method according to claim 12, further comprising:
d) determining that the terminal identification value has changed; and
e) preventing the machine from performing at least one transaction function responsive to the determination in (d).

* * * * *